Figure 1:
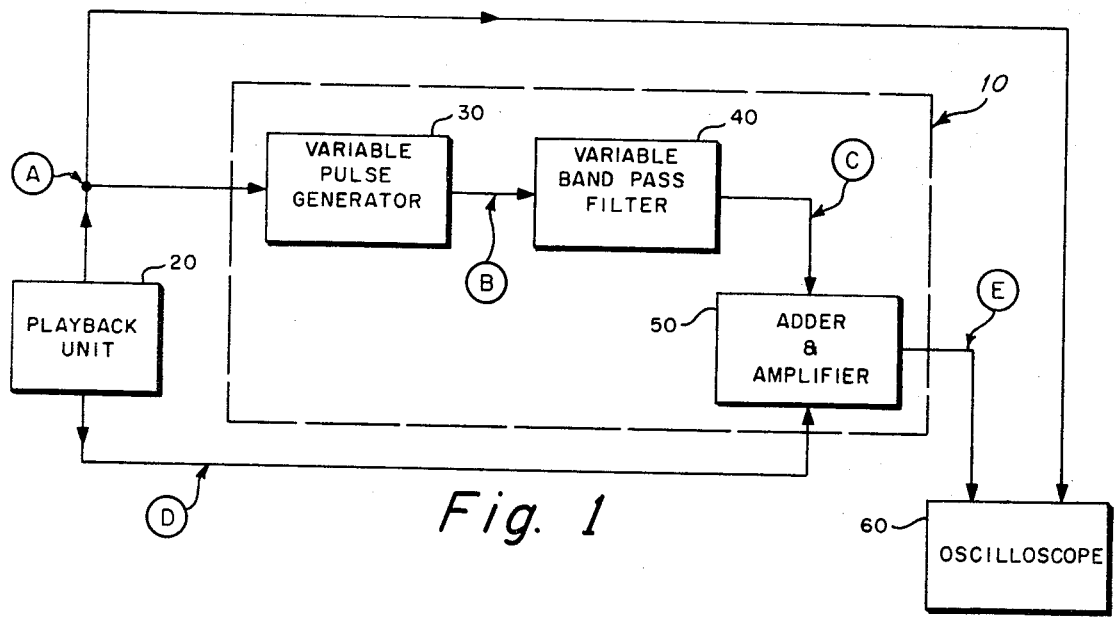

United States Patent [19]

Terpeluk

[11] 3,755,607

[45] Aug. 28, 1973

[54] WAKE SIMULATOR
[75] Inventor: Paul Terpeluk, Horsham, Pa.
[73] Assignee: The United States of America as represented by the Secretary of the Navy, Washington, D.C.
[22] Filed: July 30, 1965
[21] Appl. No.: 476,787

[52] U.S. Cl. ............................................... 35/10.4
[51] Int. Cl. ............................................ G09b 9/00
[58] Field of Search ...................................... 35/10.4

[56] References Cited
UNITED STATES PATENTS
3,040,445  6/1962  McClelland .......................... 35/10.4
3,341,697  9/1967  Kaufman et al. ................. 35/10.4 X Primary Examiner—T. H. Tubbesing
Attorney—G. J. Rubens, Henry Hansen and J. A. Cooke

EXEMPLARY CLAIM

1. An electronic device for simulating wakes of submarines or other underwater targets comprising:
   first circuit means for providing a series of output signals representative of sea background and a triggering pulse prior to each of said signals;
   second circuit means receiving said triggering pulses from said first circuit for generating in response thereto rectangular pulses having the trailing edges thereof occurring coincident in time with corresponding ones of said sea background signals;
   third circuit means receiving the output of said second circuit means for filtering the same and providing output signals indicative of the wake of the target, said wake signals having coincidence in time with corresponding ones of said sea background signals; and
   fourth circuit means receiving said series of sea background signals and said wake signal for adding the same and for providing a composite signal representative of a target wake superimposed on the sea background.

10 Claims, 2 Drawing Figures

INVENTOR.
PAUL TERPELUK
BY
ATTORNEYS

WAKE SIMULATOR

The invention described herein may be manufactured and used by or for the Government of the United States of America for governmental purposes without the payment of any royalties thereon or therefor.

The present invention relates to electronic simulation equipment and more particularly to electronic equipment for simulating a wake of a submarine or other moving underwater targets.

In the development of antisubmarine warfare infrared detection equipment, studies of the recognizability of submarine wakes as a function of sea background conditions are required. Heretofore, photographs of actual infrared submarine wakes under various sea states have been recorded on magnetic tape for later "play back" on an oscilloscope. Obviously, the variations in infrared wakes as against sea states, will be limited to the number of tape recordings obtained. In addition to the use of wake recognizability in antisubmarine warfare system studies respecting the utility of various types of infrared line scan equipment, the wake recognizability is important as a training device for familiarizing infrared operators with submarine wake recognition techniques.

The wake simulator of the present invention synthesizes submarine wakes for superimposition on magnetic recordings of various sea states. Thus, an infinite number of variations in wake characteristics can be superimposed on various sea state conditions. Briefly, this is accomplished by providing a tape playback unit for producing a number of series of electrical output signals representative of a selected sea state background, each series being preceded by an electrical triggering signal, by providing a serially connected variable pulse generator and variable bandpass filter responsive to the triggering signal for producing an electrical waveform representative of the wake to be simulated, and by providing electrical signal summing apparatus for superimposing the wake signal upon the sea background signal to produce a composite electrical signal representative of the wake in the environment of the selected sea state background.

It is, therefore, an object of the present invention to provide an electronic simulator for simulating submarine or other underwater target wakes.

Another object of the present invention is to provide an electronic device for simulating infrared wakes on various sea states.

A further object of the present invention is to provide an electronic device for simulating unlimited variations of infrared submarine wakes on an unlimited number of sea states.

A still further object of the present invention is to provide an electronic device for synthesizing submarine wakes for superposition on various sea states for studying the utility of various types of infrared line scan equipment and for use as a training device for familiarizing infrared operators with submarine wake recognition techniques.

A still further object of the present invention is to provide an electronic wake simulator wherein the wakes can be presented on a selected background in various orientations, intensities and shapes.

Various other objects and advantages will appear from the following description of an embodiment of the invention, and the novel features will be particularly pointed out hereinafter in connection with the appended claims.

Figure 2:
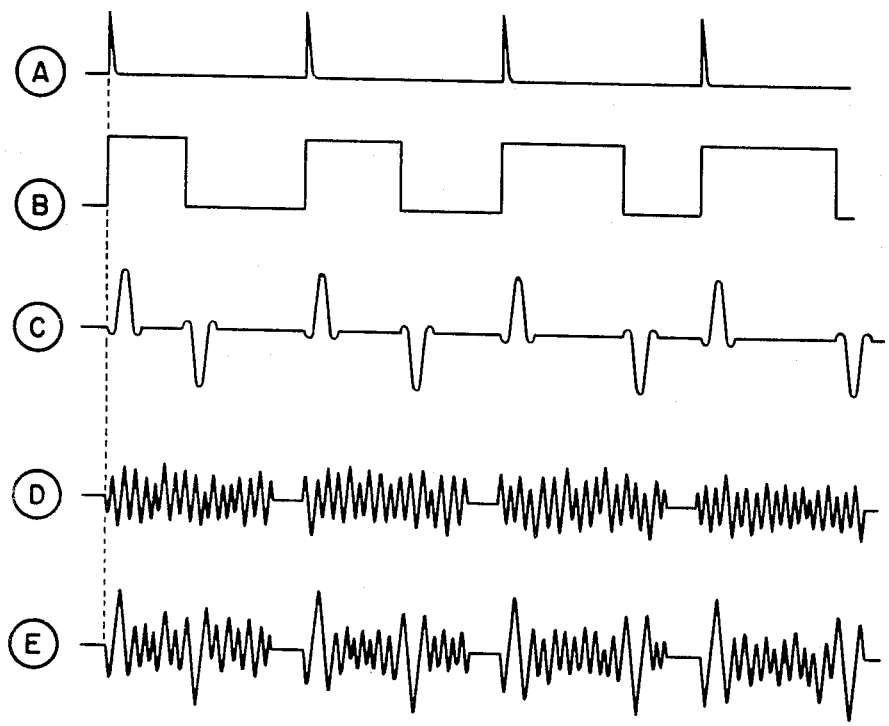

In the drawing:

FIG. 1 is a block diagram of an embodiment of a wake simulator system according to the invention, and FIG. 2 is a graphical presentation of representative signals through the wake simulator.

Ordinarily, a navigable body of water does not have a completely homogeneous temperature distribution. For example, it is well known that water at various depths may have differing temperatures which vary in accordance with temperature gradients. Further, it is known that various portions of the surface water have different temperatures. Sensitive infrared apparatus has been developed for sensing these differing temperatures and making successive, geographically displaced scans of the surface of the water to obtain for each scan an output representative of the variation in temperature over the surface along the scan path. A visual representation of the distribution of temperatures over the surface of the water may be obtained in a well known manner by simultaneously displaying successive scans in the geographical order in which they were taken.

It is known that when a ship or submarine passes over or near the surface of a body of water the existing pattern of distribution of the various surface temperatures is disturbed. This disturbance creates a distinguishable infrared trace which is commonly thought to be left by reason of a mixing of water of differing temperatures at and adjacent the surface thereof. After a period of time, this infrared trace tends to dissipate as the surface of the water gradually assumes a distribution of temperatures similar to that of the contiguous surface water. At first, the width of the infrared trace or wake is usually primarily effected by the type of vessel which created the wake. For example, a snorkling submarine usually has been found to leave a much narrower infrared wake than does a surfaced submarine, the two wakes being compared after the same period of time. With the passage of time, the infrared wake at a given location usually tends to become wider. Of course, the width of the infrared wake displayed relative to the sea state background depends upon the relative geographical excursion of a particular scan in addition to the above discussed relative width of the path of interference of the vessel. The intensity of the wake commonly tends to be affected by the sea state and by the passage of time. The foregoing are only representative of a number of possibilities for explaining the appearance of the infrared wake upon a sea state background as represented by a discontinuity in the distribution of temperature differentials.

In an exemplary embodiment according to the invention, a video tape recording of a particular sea state condition obtained during a prior mission and including triggering pulses thereon immediately prior in time to the video pulses is played back through a tape playback unit 20 and provides the input for simulator circuit 10. It should be noted here that although an actual video recording of a particular sea state is utilized to provide the video input to the simulator circuit 10, the same effect can be alternatively obtained by the use of a random pulse generator or the like to provide the background input waveforms similar to that illustrated in line D of FIG. 2. The waveforms of line D, are merely representative of a distribution of varying water temperatures along a line scan. It is helpful to visualize the representative waveforms on line D as being used to intensity modulate a horizontal line scan of an oscilloscope. For example, the troughs of the waveform may be visualized as points of light having varying degrees of brightness, and the intervening peaks may be visualized as points of darkness. If successive packets in the waveform are simultaneously displayed in geographical order as by being used to intensity modulate successive vertically displaced horizontal line scans, a distribution of points of light is obtained which is or simulates an infrared picture of the body of water scanned. Of course, some of the points of light having the same brightness may be grouped together to represent water having essentially the same temperature. It is upon this composite distribution of temperatures representing an infrared sea state condition that the simulation of an infrared wake as made by a vessel is to be superimposed.

The trigger pulse output, illustrated in line A of FIG. 2 and obtained from the playback unit 20, is applied to a variable pulse generator 30 of conventional design and configuration which generates a series of periodic rectangular pulses (see line B of FIG. 2) since the triggering is periodic. Both the amplitude and width of these rectangular pulses may be controlled by the pulse generator and the adjustment may be performed either manually or automatically. These rectangular pulses from pulse generator 30 are then supplied as an input to a conventional variable bandpass filter 40 wherein a wake of different shapes is formed by varying the filter bandpass settings. See line C of FIG. 2.

It is well known that a rectangular pulse has a complex frequency distribution including high and low frequency components. It is further well known that a high pass filter by definition will sharply attenuate low frequencies. Hence, the output waveform of a high pass filter having a rectangular pulse input can be made to resemble the differentiation of the rectangular pulse. Conversely, the output of a low pass filter having a rectangular pulse input can be made to resemble the integration of the input pulse since the high frequencies are sharply attenuated. Since a bandpass filter has output characteristics of both low and high pass filters, the shape of the output thereof in response to a rectangular pulse input will resemble that of a waveform which lies between complete differentiation and complete integration of a rectangular pulse. Hence it follows that by selectively varying the bandpass and band width characteristics of a variable bandpass filter, the output thereof in response to the input of rectangular pulses may be caused to resemble spikes of selectively varied widths, shapes and degrees of sharpness.

It may be seen from lines B and C of FIG. 2 that the leading edge spike at the output of the filter 40 will be fixed while the trailing edge spike will vary with the input pulse width. Since the width and amplitude of the square wave output of the pulse generator 30 may be varied continuously during the operation so as to achieve the desired orientation of the wake relative to the sea scene obtained by the video output of the recorder and since the width and shape of the trailing edge spike may be altered, a wake can be presented in different orientations, intensities and shapes.

The output of filter 40 (line C of FIG. 2) is then supplied as the input to an adder and amplifier 50. The video signal (line D of FIG. 2) from the tape playback unit 20 is also supplied as an input to the adder and amplifying circuit 50 where it is added to the filter signal.

The output of circuit 50 is supplied to a monitor such as an oscilloscope 60 where the composite waveform, (line E of FIG. 2) is used to intensity modulate the scope. The oscilloscope 60 has the horizontal sweep circuit initiated by the trigger pulse or sync pulse output of playback unit 20 and has a free running vertical sweep. It is understood, of course, that the output of adding and amplifying circuit 50 may be used with devices other than the oscilloscope without departing from the scope or spirit of the present invention.

In operation, a video tape of a prerecorded sea state or the random noise generator is operated and settings are made on both the pulse generator 30 and the bandpass filter 40 to obtain the desired orientation, shape and intensity of the wake. For example, the wake may be presented at an angle to the sea scene display by adjusting the pulse generator to continuously vary the rectangular pulse width. Such an arrangement is illustrated in lines B and C of FIG. 2 where it is observed that the trailing edge spike of the filter output (which forms the wake on the display) varies with the width of the input pulse. On the other hand, the wake can be displayed vertically on the sea scene by controlling the pulse output from the pulse generator 30 at a constant width. In each case, it should be noted, the shape of the wake per se may be controlled by the setting of the filter 40. The output of the filter 40 is superimposed on the sea state video output of the video tape and the composite waveform is used to intensity modulate the display 60.

It will be understood that various changes in the details, materials, steps and arrangements of parts which have been herein described and illustrated in order to explain the nature of the invention may be made by those skilled in the art within the principle and scope of the invention as expressed in the appended claims.

What is claimed is:

1. An electronic device for simulating wakes of submarines or other underwater targets comprising:
    first circuit means for providing a series of output signals representative of sea background and a triggering pulse prior to each of said signals;
    second circuit means receiving said triggering pulses from said first circuit for generating in response thereto rectangular pulses having the trailing edges thereof occurringcoincident in time with corresponding ones of said sea background signals;
    third circuit means receiving the output of said second circuit means for filtering the same and providing output signals indicative of the wake of the target, said wake signals having coincidence in time with corresponding ones of said sea background signals; and
    fourth circuit means receiving said series of sea background signals and said wake signal for adding the same and for providing a composite signal representative of a target wake superimposed on the sea background.

2. The device as defined in claim 1 wherein said first circuit means includes a playback unit for transmitting a series of video output signals from a prerecorded video tape of said sea background.

3. An electronic device for simulating wakes of submarines or other underwater targets comprising:
    first circuit means for providing a series of output signals representative of sea background and a series of triggering pulses occurring prior to each series of said sea background signals;

second circuit means receiving said series of triggering pulses from said first circuit for generating a series of rectangular pulses third circuit means receiving the output of said second circuit means for filtering the same and providing output signals indicative of the wake of the target;

fourth circuit means receiving said series of sea background signals and said wake signal including means for adding the same and for providing a composite signal representative of a target wake superimposed on the sea background, said fourth circuit means further including an amplifier circuit for amplifying said composite signal.

4. An electronic device for simulating wakes of submarines or other underwater targets comprising:

first circuit means including a playback unit for transmitting a series of video output signals representative of sea background from a prerecorded video tape of said sea background, said first circuit means further including means for providing a series of triggering pulses occurring prior to each series of said sea background video output signals;

second circuit means receiving said series of triggering pulses from said first circuit for generating a series of rectangular pulses, said second circuit means further including means for varying the amplitude and width of said rectangular pulses;

third circuit means receiving the output of said second circuit means for filtering the same and providing output signals indicative of the wake of the target;

fourth circuit means receiving said series of sea background signals and said wake signal for adding the same and for providing a composite signal representative of a target wake superimposed on the sea background.

5. The device as defined in claim 4 wherein said second circuit means is a variable pulse generator.

6. The device as defined in claim 5 wherein said third circuit means is a variable bandpass filter.

7. The device as defined in claim 6 further including display means receiving said composite signal from said fourth circuit means.

8. The device as defined in claim 7 wherein said display means is an oscilloscope which is intensity modulated by said composite signal and triggered by said triggering pulses.

9. An electronic device for simulating infrared wakes comprising:

first circuit means for providing a series of output signals representative of infrared background and a triggering pulse prior to each of said background signals;

second circuit means receiving said triggering pulses from said first circuit for generating in response thereto a series of rectangular pulses, the trailing edges thereof having coincidence in time with corresponding ones of said background signals;

third circuit means receiving the output of said second circuit means for filtering the same and providing output signals indicative of the infrared wake, said wake signals having coincidence in time with corresponding ones of said background signals; and fourth circuit means receiving said series of background signals and said wake signal for adding the same and for providing a composite signal representative of an infrared wake superimposed on the infrared background.

10. An electronic device for simulating wakes comprising:

first circuit means for providing a series of output signals representative of background and a series of triggering pulses;

second circuit means receiving said series of triggering pulses from said first circuit for generating a series of rectangular pulses of selectively variable widths and amplitudes;

third circuit means including selectively variable bandpass filter means receiving the output of said second circuit means for filtering the same and providing in response to the trailing edge of said rectangular pulses output signals indicative of the wake and having coincidence in time with respective ones of said background signals; and fourth circuit means receiving said series of background signals and said wake signal for adding the same and for providing a composite signal representative of a selectively variable wake superimposed in a selectively variable position on the background.

* * * * *